United States Patent [19]
Katz et al.

[11] Patent Number: 5,581,775
[45] Date of Patent: Dec. 3, 1996

[54] HISTORY BUFFER SYSTEM

[75] Inventors: Itai Katz, Netanya, Israel; Oran Uzrad, Sunnyvale, Calif.; Doron Shoham, Hadera, Israel

[73] Assignee: Motorola, Inc., Schaumburg, Ill.

[21] Appl. No.: 317,069

[22] Filed: Oct. 3, 1994

[30] Foreign Application Priority Data

Oct. 2, 1993 [GB] United Kingdom ............ 9320354

[51] Int. Cl.$^6$ ............................................. G06F 9/38
[52] U.S. Cl. .................. 395/587; 395/410; 395/800; 364/DIG. 2; 364/923.6; 364/926.2; 364/931.11; 364/931.52
[58] Field of Search ............................. 395/800, 375, 395/410

[56] References Cited

U.S. PATENT DOCUMENTS

| | | | |
|---|---|---|---|
| 4,044,337 | 8/1977 | Hicks et al. | 395/250 |
| 5,450,560 | 9/1995 | Bridges et al. | 395/410 |

FOREIGN PATENT DOCUMENTS

| | | |
|---|---|---|
| 0306891 | 3/1989 | European Pat. Off. |

OTHER PUBLICATIONS

Patt et al. "Critical Issues Regarding HPS, a High Performance Microarchitecture", ACM 1985.
Smith et al "Implementing Precise Interrupts in Pipelined Processors" IEEE 1988.
Wang et al. "Area and Performance Comparison of Pipelined RISC Processors Implementing Different Precise Interrupt Methods" Jul. 1993, IEEE.
Hwu et al. "Design Choices for HPS in Microprocessor Chip", 1987.
Wang et al. "Implementing Precise Interruptions in Pipelined RISC Processors" IEEE Aug. 1995.
James E. Smith et al., IEEE Transactions on Computers, "Implementing Precise Interrupts in Pipelined Processors", May 1988, No. 5, pp. 562–573.

*Primary Examiner*—Larry D. Donaghue
*Attorney, Agent, or Firm*—Vincent B. Ingrassia; Harry A. Wolin; Rennie William Dover

[57] ABSTRACT

A history buffer system (12) for allowing the recovery of executed instructions comprises main history buffer (14) for storing addresses of issued instructions and at least one subsidiary history buffer (16, 22) associated with a predetermined type of data, such as fixed or floating point data. The subsidiary history buffer (16, 22) has a plurality of entries (Y, Z), each entry for storing a pointer to a register (18, 26) and the data stored in the register. The main history buffer (14) is arranged to store control data (fxtag, fptag) which associates the entries in a subsidiary history buffer with the appropriate issued instructions of the same data type stored in the main history buffer. The main history buffer (14) may comprise a storage entry for each issued instruction, each storage entry having a field for storing the address of an issued instruction, and at least one tag field (fxtag, fptag) corresponding to the at least one subsidiary history buffer (16, 22) for storing the control data.

11 Claims, 3 Drawing Sheets

FIG. 1 —PRIOR ART—

HISTORY BUFFER SYSTEM

This invention relates to a history buffer system for implementing a precise exception model in a processor such that executed instructions may be recovered in the event of an exception.

BACKGROUND OF THE INVENTION

A history buffer generally enables the deletion of previously issued instructions in a processor which issues instructions speculatively and has out-of-order completion. For each issued instruction, a pointer to the destination register (i.e. the number of the destination register), and the data stored in the destination register, is saved in the history buffer.

When implementing a history buffer system, several factors need to be considered. For example, different instructions have different operands. The destination registers of the different instructions usually have different sizes. Moreover, some instructions do not effect registers, and in some architectures, some instructions effect two registers, each of which may be of a different size. For example:

- a fixed point arithmetic instruction effects fixed point registers which are 32 bits in size;
- a floating point arithmetic instruction effects floating point registers which are 64 bits in size;
- a store instruction does not effect any general purpose register;
- a fixed point load with update instruction effects two fixed point registers; and
- a floating point load with update instruction effects one fixed point register and one floating point register.

In order to account for the different sizes of the different data types which are to be stored in the history buffer, typically a fixed size entry is allocated for each instruction which is large enough for the data having the greatest size. For example, an entry having an 64 bit data field (plus other fields) is allocated for each instruction. Thus, whenever a fixed point instruction is issued, 32 bits (64-32) of the allocated history buffer entry are not used. Moreover, whenever a store instruction is issued, none of the allocated 64 bits are used.

The prior art history buffer systems therefore inefficiently utilize storage space, with a result that larger silicon area is required than is necessary.

In a processor which does not have a floating point unit, a history buffer which supports floating point instructions requires significant storage area which is not utilized.

There is therefore a need for a history buffer system which utilize the storage area in a more efficient manner.

SUMMARY OF THE INVENTION

In accordance with the present invention there is provided a history buffer system for allowing the recovery of executed instructions comprising:

a main history buffer for storing addresses of issued instructions; and at least one subsidiary history buffer associated with a predetermined type of data, the subsidiary history buffer having a plurality of entries, each entry for storing a pointer to a register and the data stored in the register, the main history buffer being arranged to store control data which associates the entries in a subsidiary history buffer with the appropriate issued instructions of the same data type stored in the main history buffer.

Since a subsidiary history buffer is associated with a predetermined type of data, the size of the subsidiary history buffer is chosen for that data type. This ensures that only the exact amount of storage area, which is required by each instruction, need be allocated. The storage size of the main history buffer therefore need not take account of the size of the different data types. Thus, an advantage of the invention is that data is stored efficiently in the history buffer. This means that for a given silicon area, performance can be improved, or for a given performance requirement, silicon area can be saved.

In a preferred arrangement, the main history buffer comprises a storage entry for each issued instruction, each storage entry having a field for storing the address of an issued instruction, and at least one tag field corresponding to the at least one subsidiary history buffer for storing the control data.

The history buffer system may further comprise control logic coupled to the main history buffer for using the control data to determine when all the entries of the corresponding subsidiary history buffer are full and for generating a flag in response thereto. The control logic preferably comprises a logical OR gate for logically combining the bits in the at least one tag field of all the storage entries, the logical combination providing an indication when the subsidiary history buffer is full and the number of entries in the subsidiary history buffer which have to be recovered from the subsidiary history buffer in the event of an exception.

Preferably, the history buffer system comprises a subsidiary history buffer associated with floating point data and a subsidiary history buffer associated with fixed point data. It will be appreciated that the subsidiary history buffers can be simply removed or added for different processors. For example, for a processor which does not include a floating point unit, the subsidiary history buffer, which stores floating point data types, is omitted along with the floating point execution unit. Thus, a further advantage of the invention is that it has a modular structure.

In more recent chip architectures, the fixed point register file and the floating point register file are completely separated. Each of these register files has its own write back bus and a set of source buses. Therefore, it is desirable not to mix floating point and fixed point data buses.

With the prior art history buffers, the buses have to be mixed, since buses from both the floating point area and the fixed point area have to be dragged to some central area where the data storage field of the history buffer is located. However, the history buffer system in accordance with the present invention enables the floating point history buffer to be located in the floating point area of the chip and the fixed point history buffer to be located in the fixed point area of the chip and thus, enables for the floating point and fixed point data buses to be separate.

BRIEF DESCRIPTION OF THE DRAWINGS

A history buffer system in accordance with a preferred embodiment of the invention will now be described, by way of example only, with reference to the accompanying drawings in which.

DETAILED DESCRIPTION OF THE DRAWINGS

In order to achieve maximum performance, some processors support speculative and out-of-order execution, wherein many pieces of the instruction stream are concurrently processed by the processor independent of its sequence specified by the executing program. Instructions execute in parallel, complete out-of-order, and some are even executed speculatively in anticipation of the instruction stream going in a certain direction. The hardware is careful to ensure that this out of order operation never has an effect different than that specified by the program. This requirement is most difficult to observe when an exception occurs after instructions, that logically follow the faulting instruction, have already completed. At the time of an exception, the machine state becomes visible to other processes and therefore, must be in its correct architecturally specified condition. The processor takes care of this in hardware, by automatically backing the machine up to the instruction which caused the exception, and is therefore said to implement a 'precise' exception model.

Figure 1:
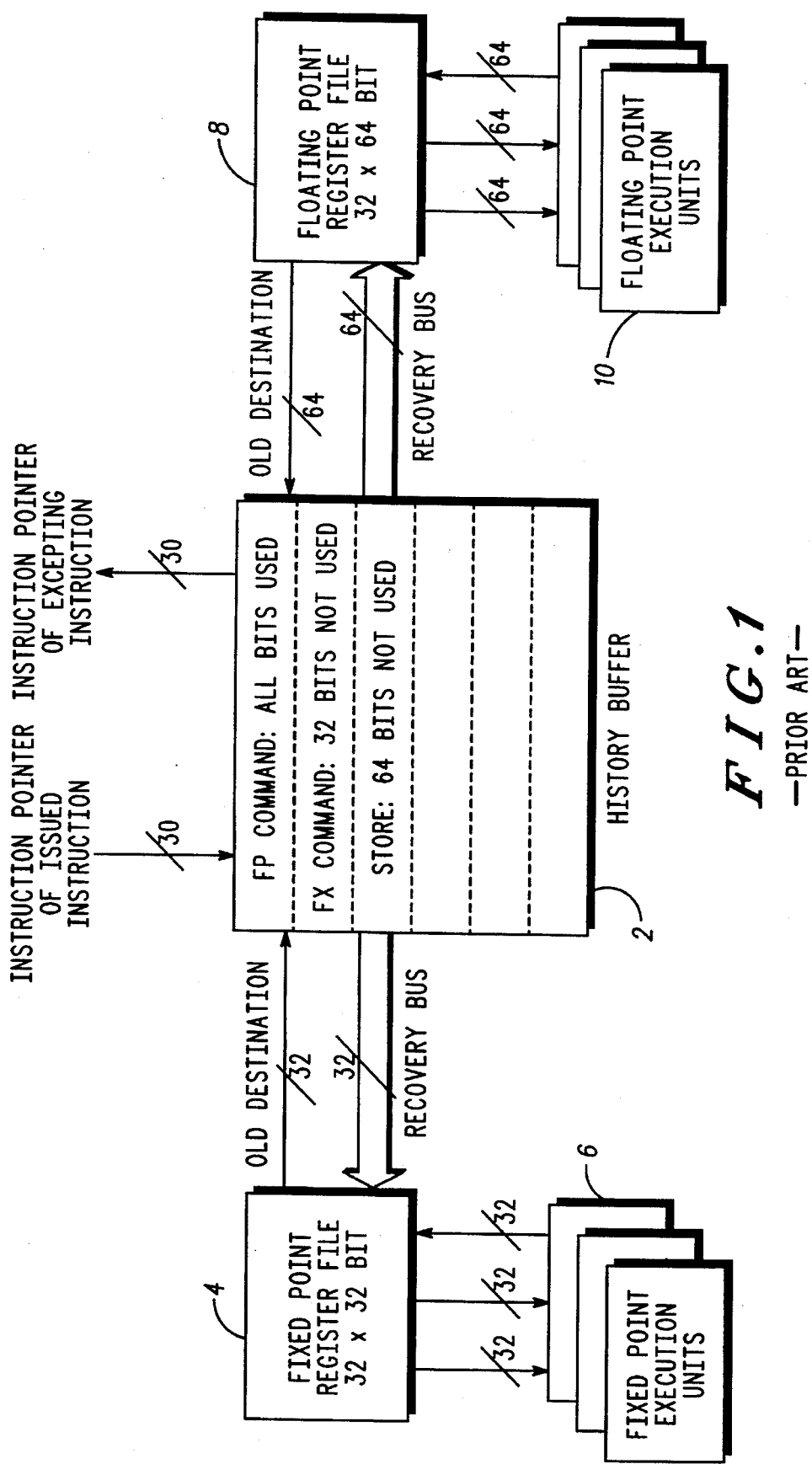
FIG. 1 is a block schematic diagram of a prior art history buffer system.

A history buffer, such as the one shown in FIG. 1, is used to recover from an exception. FIG. 1 shows a conventional history buffer system comprising a history buffer 2, a fixed point register file 4 coupled to the history buffer 2 and to fixed point execution units 6, and a floating point register file 8 coupled to the history buffer 2 and to floating point execution units 10 (only the data buses are shown).

The history buffer is typically implemented as a FIFO queue, which records the relevant machine state at the time each instruction is issued. Instructions are placed on the tail of the queue when they are issued and percolate to the head of the queue while they are in execution. An issue pointer in the history buffer points to the next vacant entry. When an instruction is issued, the issue pointer is advanced to the next vacant entry. Instructions remain in the queue until they complete execution, so that in the event of an exception, the machine state necessary to recover the architectural state is available. As instructions complete execution, they are released (retired) from the queue and the buffer storage reclaimed for new instructions entering the queue.

When an execution unit completes the processing of an instruction, it writes back the result to the appropriate register file. In the same cycle, a bit called the 'done bit' is set in the instruction's entry in the history buffer 2 and the instruction is considered to be a completed instruction. An instruction is considered to be retired when it is completed and all the instructions, which were issued before it, are also completed. A retire pointer in the history buffer points to the last instruction which was not retired.

An exception is generated at any time during instruction execution and is recorded in the history buffer when the instruction finishes execution. The exception is not recognized until the faulting instruction reaches the head of the history queue. When the exception is recognised, the queue is reversed and the machine is restored to its state at the time the instruction issued. In the process of restoration or recovery, all or some of the instructions may be recovered from the history buffer. The recovery process may take one or more cycles depending on how many instructions have to be recovered and the bandwidth of the recovery bus (from the history buffer to the register files). The recovery process uses the issue pointer. In case all the instructions from the history buffer have to be recovered, the issue pointer scans all the entries from the point it had before recovery began, to the entry pointed to by the retire pointer. All the instructions residing in the scanned entries are recovered.

For each issued instruction, a pointer to the destination register file (8 or 4 in FIG. 1) and the data in the destination register, which comprises the write-back result, are stored in the history buffer 2. In order to account for the size of the floating point data, the data field of the history buffer must be fixed to 64 bits. Thus, for instructions like fixed point and store instructions, not all of the data field is used. This is a significant disadvantage in the prior art implementations.

Figure 2:
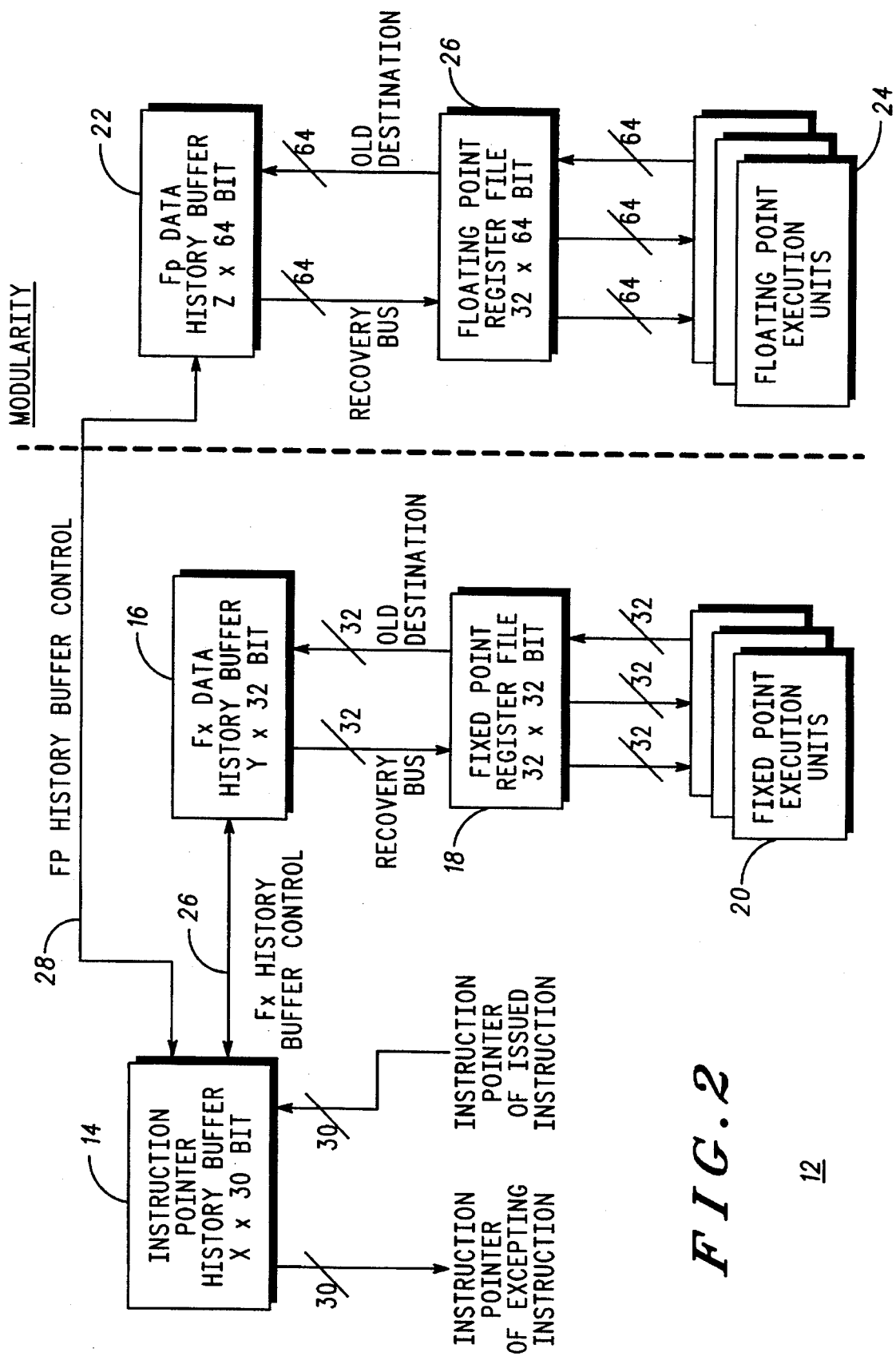
FIG. 2 is a block schematic diagram of a history buffer system in accordance with the present invention.

Referring now to FIG. 2, a history buffer system 12 in accordance with a preferred embodiment of the invention comprises a main history buffer 14 (or instruction pointer history buffer) and subsidiary history buffers, 16 and 22, associated with different types of data. The size of each subsidiary history buffer depends on the type of data which is stored therein. The subsidiary history buffers communicate with the main history buffer via respective control lines 26 and 28.

In the preferred embodiment, the subsidiary buffers comprise a fixed point history buffer 16, which is coupled to a fixed point register file 18 coupled to fixed point execution units 20, and a floating point history buffer 22, which is coupled to a floating point register file 26 coupled to floating point execution units 24 (only the data buses are shown). The fixed point history buffer has four 32 bit entries (Y=4), the floating point history buffer has three 64 bit entries (Z=3) and the main history buffer has six 30 bit entries (X=6). The values X, Y and Z may vary from application to application. It will be appreciated that any number of combinations of subsidiary history buffers (from one upwards) can be used depending on the specific application.

Figure 3:
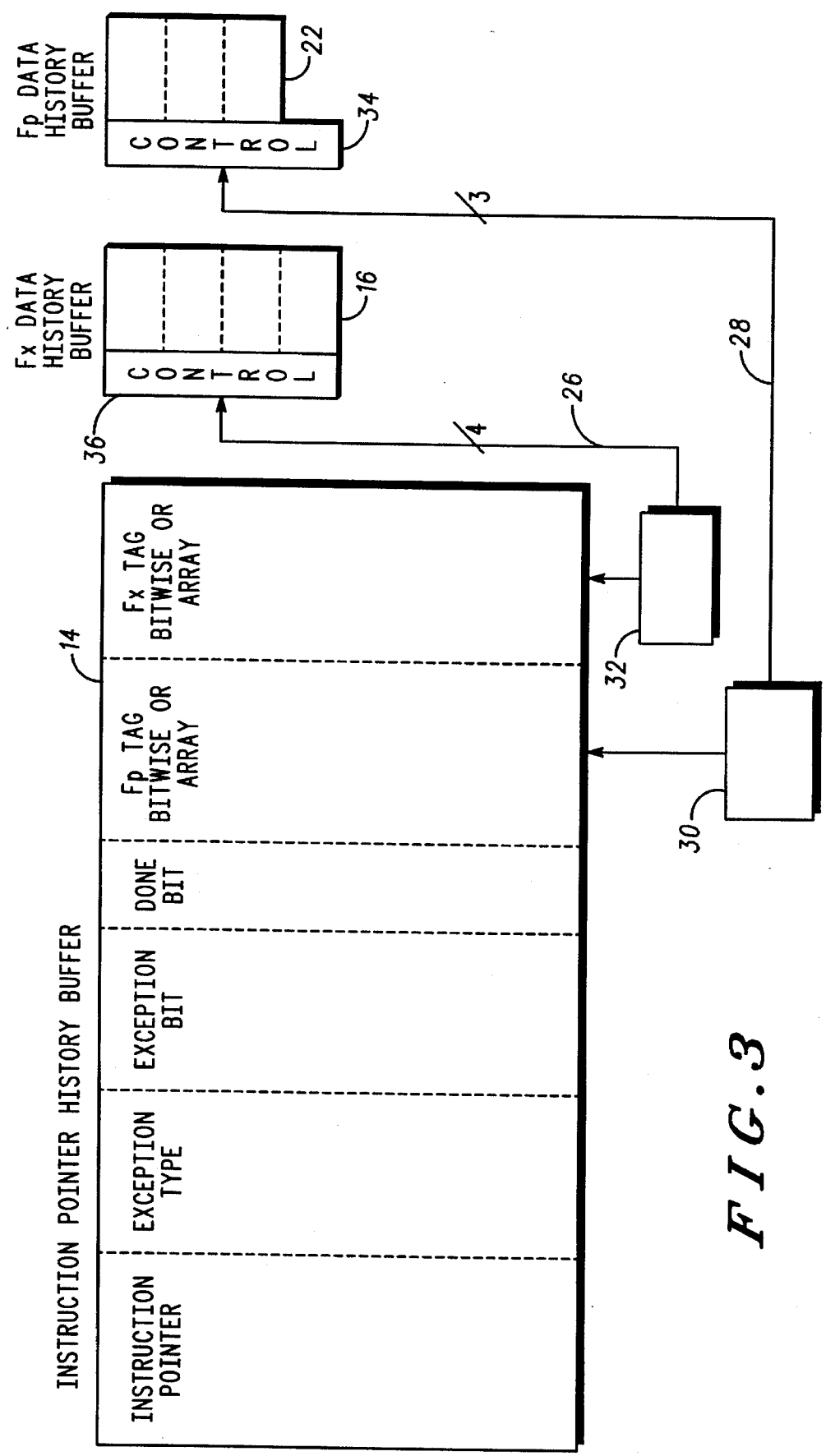
FIG. 3 is a more detailed schematic diagram of the history buffer system of FIG. 2.

FIG. 3 is a schematic diagram of the history buffer system 12 of FIG. 2 which shows the history buffer fields. Each entry in the main history buffer 14 stores, for each issued instruction, an instruction pointer, an exception type, exception bit, a done bit and tag fields, fxtag and fptag, for the fixed point history buffer and the floating point history buffer respectively. The fixed point control line 26 is coupled to the fxtag field and the floating point control line 28 is coupled to the fptag field.

Each one of the main history buffer 14, fixed point history buffer 16 and floating point history buffer 22, has its own issue pointer. The issue pointer of the main history buffer 14 is incremented for each issued instruction. The issue pointer for the fixed point history buffer 16 is incremented only for issued fixed point instructions. The issue pointer for the floating point history buffer 22 is incremented only for issued floating point instructions. When an instruction with no destination registers (such as a store instruction) is issued, only the main history buffer issue pointer is incremented.

There is only one retire pointer, however, and this is implemented in the main history buffer 14,: The retire pointer is used for the following.

1. Identifying the last recovered instruction from the main history buffer 14, when recovering from exception or interrupt.
2. Generating signals which are related to 'Top of history buffer' (e.g. execution units pipe flush).
3. Identifying the 'history buffer empty' state.
4. Identifying the 'history buffer full' state, in the case where there are no vacant entries in the main history buffer 14.

The tag fields fxtag and fptag in the main history buffer 14 each have two unrelated purposes. They are used to indicate when the respective subsidiary history buffer is full. In addition, they are used to identify the instructions which have to be recovered from the respective subsidiary history buffers, in the event of an exception or interrupt recovery.

The manner in which the fptag field achieves these purposes will now be described with reference to FIGS. 2 and 3 and Tables 1 and 2. Tables 1 and 2 show the fptag and fxtag values for an exemplary number of issued instructions. The fixed point history buffer has three entries and the floating point history buffer has four entries. Initially all of the history buffers are empty. The first issued instruction has long latency and therefore, the retire pointer is not updated.

Whenever a floating point instruction is issued, its address is written into the instruction pointer field of the main history buffer 14 and its floating point history buffer issue pointer is written into the fptag field in the main history buffer 14. For the floating point instruction issued at line 1 of Table 1, destination data is written to the first entry of the floating point history buffer 22. The fptag field is therefore 0001. When instructions which do not occupy an entry in the floating point history buffer 22, such as fixed point, condition register, store instructions, are issued, the fptag field is cleared to 0000 (see line 2 in Table 1). Whenever an instruction is retired from the main history buffer 14, its fptag and fxtag fields are cleared.

TABLE 1

| Pointers | Instruction | fgtag | fxtag |
|---|---|---|---|
| retire | fp | 0001 | 000 |
|  | fx | 0000 | 001 |
|  | store | 0000 | 000 |
|  | fp | 0010 | 000 |
|  | store | 0000 | 000 |
|  | fp | 0100 | 000 |
|  | fx | 0000 | 010 |
|  | fp | 1000 | 000 |
| issue |  | 0000 | 000 |

Control logic 30 logically ORs all the fptag fields in a bit-wise manner. The ORed result indicates whether the floating point history buffer 14 is full. For the example shown in Table 1, the bit-wise OR result for the fptag is 1111 which indicates that all the entries of the floating point history buffer are occupied. In response to the generation of the result 1111, a 'floating point history buffer full' flag is generated.

The 'fixed point history buffer full' flag is generated in a similar manner. For the example described herein, the 'full' ORed result is 111. For the fixed point history buffer, the result, which indicates only one bit is cleared, must be detected so that the load store unit can be prevented from issuing a fixed point load and update instruction which occupies two entries in the fixed point history buffer.

TABLE 2

| Pointers | Instruction | fptag | fxtag |
|---|---|---|---|
|  | fp | 0000 | 000 |
|  | fx | 0000 | 000 |
|  | store | 0000 | 000 |
| retire | fp | 0010 | 000 |
|  | store | 0000 | 000 |
|  | fp | 0100 | 000 |
|  | fx | 0000 | 010 |
|  | fp | 1000 | 000 |
| issue |  | 0000 | 000 |

Table 2 shows the values of the fptag and fxtag fields after the first three instructions have been retired from the main history buffer 14. The retire pointer is incremented as shown. The bit-wise OR result of the fptag field becomes 1110 and for the fxtag field 000 which indicate that the floating point history buffer 22 and the fixed point history buffer 16 are both not full: the respective 'history buffer full' flag is reset.

The recovery process for the floating point history buffer 22 is performed using the fptag field in the following manner.

At the beginning of the recovery process, the last fptag bit-wise-OR-result is sent to control logic 34 of the floating point history buffer 22, via the control line 28. This result is called the recovery vector. The number of bits which are set in this vector identifies exactly the number of instructions which are to be recovered. Recovery direction is opposite to issue direction. Thus, the last issued instruction is recovered first. Thus, the use of the recovery vector sent from the control logic 30 combined with the known position of the issue pointer, identifies the instructions which have to be recovered from the floating point history buffer 22. The recovery process in the floating point history buffer is controlled by a simple localized state machine which is well known in the art.

We claim:

1. A history buffer system for allowing the recovery of executed instructions in the event of an exception comprising:

a main history buffer for storing addresses of issued instructions, the main history buffer comprising a plurality of storage entries, each storage entry having a field for storing the address of an issued instruction; and at least one subsidiary history buffer, each one of the at least one subsidiary history buffers being associated with a respective predetermined type of data, and having a plurality of entries, each entry for storing a pointer to a register associated with the respective subsidiary history buffer and the data of the predetermined type stored in the register, the size of each one of the at least one subsidiary history buffers depending on the predetermined type of data to be stored therein, wherein each storage entry of the main history buffer further comprises at least one tag field corresponding to the at least one subsidiary history buffer for storing control data, which control data of an issued instruction of the same data type as the at least one subsidiary history buffer provides an indication of the position of the subsidiary history buffer's issue pointer.

2. A history buffer system according to claim 1 wherein a tag field is m bits wide, where m corresponds to the number of entries in the corresponding subsidiary history buffer.

3. A history buffer system according to claim 2 wherein a storage entry for an issued instruction comprises two m-bit entries in a tag field.

4. A history buffer system according to claim 2 further comprising control logic coupled to the main history buffer, wherein the control logic comprises a logical OR gate for logically combining the bits in the at least one tag field of all the storage entries, the logical combination providing an indication when the subsidiary history buffer is full and the number of entries in the subsidiary history buffer which have to be recovered from the subsidiary history buffer in the event of an exception.

5. A history buffer system according to claim 1, further comprising control logic coupled to the main history buffer for using the control data to determine when all the entries of the corresponding subsidiary history buffer are full and for generating a flag in response thereto.

6. A history buffer system according to claim 1, further comprising a subsidiary history buffer associated with floating point data and a subsidiary history buffer associated with fixed point data, the main history buffer storing control data for the floating point subsidiary history buffer and control data for the fixed point subsidiary history buffer.

7. A history buffer system according to claim 6, wherein a storage entry comprises a tag field for the floating point subsidiary history buffer and a tag field for the fixed point subsidiary history buffer.

8. A history buffer system for allowing the recovery of executed instructions in the event of an exception comprising:

a main history buffer for storing addresses of issued instructions, the main history buffer comprising a plurality of storage entries, each storage entry having a field for storing the address of an issued instruction;

at least one subsidiary history buffer, each one of the at least one subsidiary history buffers being associated with a respective predetermined type of data, and having a plurality of entries, each entry for storing a pointer to a register associated with the respective subsidiary history buffer and the data of the predetermined type stored in the register, the size of each one of the at least one subsidiary history buffers depending on the predetermined type of data to be stored therein, wherein each storage entry of the main history buffer further comprises at least one tag field corresponding to the at least one subsidiary history buffer, the at least one tag field being m bits wide, where m corresponds to the number of entries in the corresponding at least one subsidiary history buffer, and for storing control data which control data of an issued instruction of the same data type as the at least one subsidiary history buffer provides an indication of the position of the subsidiary history buffer's issue pointer; and control logic coupled to the main history buffer, the control logic comprising a logical OR gate for logically combining the bits in the at least one tag field of all the storage entries, the logical combination providing an indication when the subsidiary history buffer is full and the number of entries in the subsidiary history buffer which have to be recovered from the subsidiary history buffer in the event of an exception.

9. A history buffer system for allowing the recovery of executed instructions in the event of an exception comprising:

a main history buffer for storing addresses of issued instructions, the main history buffer comprising a plurality of storage entries, each storage entry having a field for storing the address of an issued instruction;

a first subsidiary history buffer associated with a first predetermined type of data; and a second subsidiary history buffer associated with a second different predetermined type of data, the first and second subsidiary history buffers each having a plurality of entries, each entry for storing a pointer to a register associated with the respective one of the first and second subsidiary history buffers and the data stored in the register, the size of the first subsidiary history buffer depending on the first predetermined type of data to be stored therein and the size of the second subsidiary history buffer depending on the second predetermined type of data to be stored therein, wherein each storage entry of the main history buffer further comprises first and second tag fields corresponding to the first and second subsidiary history buffers respectively, the first and second tag fields for storing control data, which control data of one of the first and second tag fields of an issued instruction of the same data type as the respective one of the first and second subsidiary history buffers provides an indication of the position of the respective subsidiary history buffer's issue pointer.

10. A history buffer system according to claim 9 wherein the first tag field is m bits wide, where m corresponds to the number of entries in the first subsidiary history buffer, and the second tag field is n bits wide, where n corresponds to the number of entries in the second subsidiary history buffer.

11. A history buffer system according to claim 10 further comprising:

a first logical OR gate for logically combining the bits in the first tag field of all the storage entries, the logical combination providing an indication when the first subsidiary history buffer is full and the number of entries in the first subsidiary history buffer which have to be recovered from the first subsidiary history buffer in the event of an exception; and a second logical OR gate for logically combining the bits in the second tag field of all the storage entries, the logical combination providing an indication when the second subsidiary history buffer is full and the number of entries in the second subsidiary history buffer which have to be recovered from the second subsidiary history buffer in the event of an exception.

* * * * *